United States Patent
Mentzer et al.

(10) Patent No.: US 7,342,212 B2
(45) Date of Patent: Mar. 11, 2008

(54) ANALOG VERTICAL SUB-SAMPLING IN AN ACTIVE PIXEL SENSOR (APS) IMAGE SENSOR

(75) Inventors: Ray Allen Mentzer, Corvallis, OR (US); Frank J. DeMonte, Corvallis, OR (US); Jeffery Steven Beck, Philomath, OR (US); Matthew Michael Borg, Albany, OR (US); Charles Grant Myers, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 48 days.

(21) Appl. No.: 11/395,193

(22) Filed: Mar. 31, 2006

(65) Prior Publication Data

US 2007/0228256 A1    Oct. 4, 2007

(51) Int. Cl.
*H01L 27/00* (2006.01)
*G01J 1/44* (2006.01)
*H01J 40/14* (2006.01)
*H03F 3/08* (2006.01)

(52) U.S. Cl. ............... 250/208.1; 250/214 R; 330/308; 348/300; 348/308

(58) Field of Classification Search ............ 250/208.1, 250/214 R, 214 A; 330/308; 348/300–302, 348/308
See application file for complete search history.

(56) References Cited

U.S. PATENT DOCUMENTS 6,366,320 B1* 4/2002 Nair et al. ................ 348/300
2002/0154347 A1* 10/2002 Funakoshi et al. ......... 358/513

\* cited by examiner

*Primary Examiner*—Patrick J. Lee
(74) *Attorney, Agent, or Firm*—RatnerPrestia

(57) ABSTRACT

An active pixel sensor (APS) image sensor comprises an array of pixel circuits corresponding to rows and columns of pixels, a plurality of amplifiers that buffer signals output by the array of pixel circuits, and a plurality of sample and hold circuits that read the buffered signals. A routing mechanism is positioned between the array of pixel circuits and the plurality of amplifiers. A controller selects a set of the pixel circuits for sampling and is configured to control the routing mechanism to couple each pixel circuit in the set to a different one of the amplifiers during a normal mode of operation and to couple each pixel circuit of a subset of pixel circuits in a first set of pixel circuits to a different amplifier of a first subset of the amplifiers, to couple each pixel circuit of a subset of pixel circuits in a second set of pixel circuits to a different amplifier of a second subset of the amplifiers, and to connect the amplifiers of the first and second subsets of amplifiers in pairs to a common one of the sample and hold circuits during a sub-sampling mode of operation.

19 Claims, 3 Drawing Sheets

ANALOG VERTICAL SUB-SAMPLING IN AN ACTIVE PIXEL SENSOR (APS) IMAGE SENSOR

BACKGROUND OF THE INVENTION

One type of prior art image sensor is a charge-coupled device (CCD) image sensor. CCD image sensors typically include a very closely packed array of polysilicon electrodes that are formed on the surface of the CCD imaging chip. Conceptually, a CCD is a two-dimensional array of Metal Oxide Semiconductor (MOS) capacitors that collect and transfer photon-generated charge. CCD image sensors typically include multiple shift registers to transfer charge from the CCD array to amplifiers.

Another type of prior art image sensor is an active pixel sensor (APS) image sensor. APS image sensors are typically fabricated using Complimentary Metal Oxide Silicon (CMOS) processing technology, and are also typically referred to as CMOS image sensors. APS image sensors sense light by converting incident light (photons) into electronic charge (electrons) by a photo-conversion process. Color APS image sensors are typically made by coating each individual pixel with a filter color (e.g., red, green, and blue). APS image sensors typically include a photo sensor (e.g., photo diode) and several CMOS transistors for each pixel. Some APS image sensors provide integrated analog-to-digital conversion and full timing control on a single integrated circuit.

Some APS image sensors support sub-sampling modes of operation. In sub-sampling modes, the amount of data that is imaged is reduced, while the field of view is maintained. For example, in a two-to-one sub-sampling mode (e.g., sample two pixels, skip two pixels, sample two pixels, etc.), the amount of image data that is processed is reduced by a factor of four when sub-sampling in both the horizontal and vertical directions. In a four-to-one sub-sampling mode (e.g., sample two pixels, skip six pixels, sample two pixels, etc.), the amount of image data that is processed is reduced by a factor of sixteen when sub-sampling in both the horizontal and vertical directions. In general, enabling sub-sampling increases the frame rate for a constant clock rate or, alternatively, the clock rate may be proportionally reduced to reduce the frame rate and power. Unfortunately, a drawback of conventional sub-sampling methods is that video information on skipped pixels is discarded resulting in an image with artifacts, particularly in scenes with considerable contrast. In other methods, all pixels are quantized. To remove artifacts and reduce date requirements, averaging of the pixel outputs is performed in the digital domain. This results in a pleasing image, but provides no or minimal savings in power. Averaging in the digital domain can add noise to the final image. Also, prior systems underutilize chip resources and consume needless power.

SUMMARY OF THE INVENTION

In one embodiment, an integrated circuit includes an active pixel sensor (APS) image sensor comprising an array of pixel circuits corresponding to rows and columns of pixels, a plurality of amplifiers that buffer signals output by the array of pixel circuits, and a plurality of sample and hold circuits that read the buffered signals. The integrated circuit further includes a routing mechanism positioned between the array of pixel circuits and the plurality of amplifiers, and a controller that selects sets of the pixels circuits for sampling. The controller is configured to control the routing mechanism to couple each pixel circuit in a set to a different one of the amplifiers during a normal mode of operation, and to couple each pixel circuit of a subset of pixel circuits in a first set of pixel circuits to a different amplifier of a first subset of the amplifiers, to couple each pixel circuit of a subset of pixel circuits in a second set of pixel circuits to a different amplifier of a second subset of the amplifiers, and to couple the amplifiers of the first and second subsets of amplifiers in pairs to a common one of the sample and hold circuits during a sub-sampling mode of operation.

BRIEF DESCRIPTION OF THE DRAWINGS

The foregoing aspects and many of the attended advantages of this invention will become more readily appreciated as the same become better understood by reference to the following detailed description, when taken in conjunction with the accompanying drawings, wherein.

DESCRIPTION OF THE INVENTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
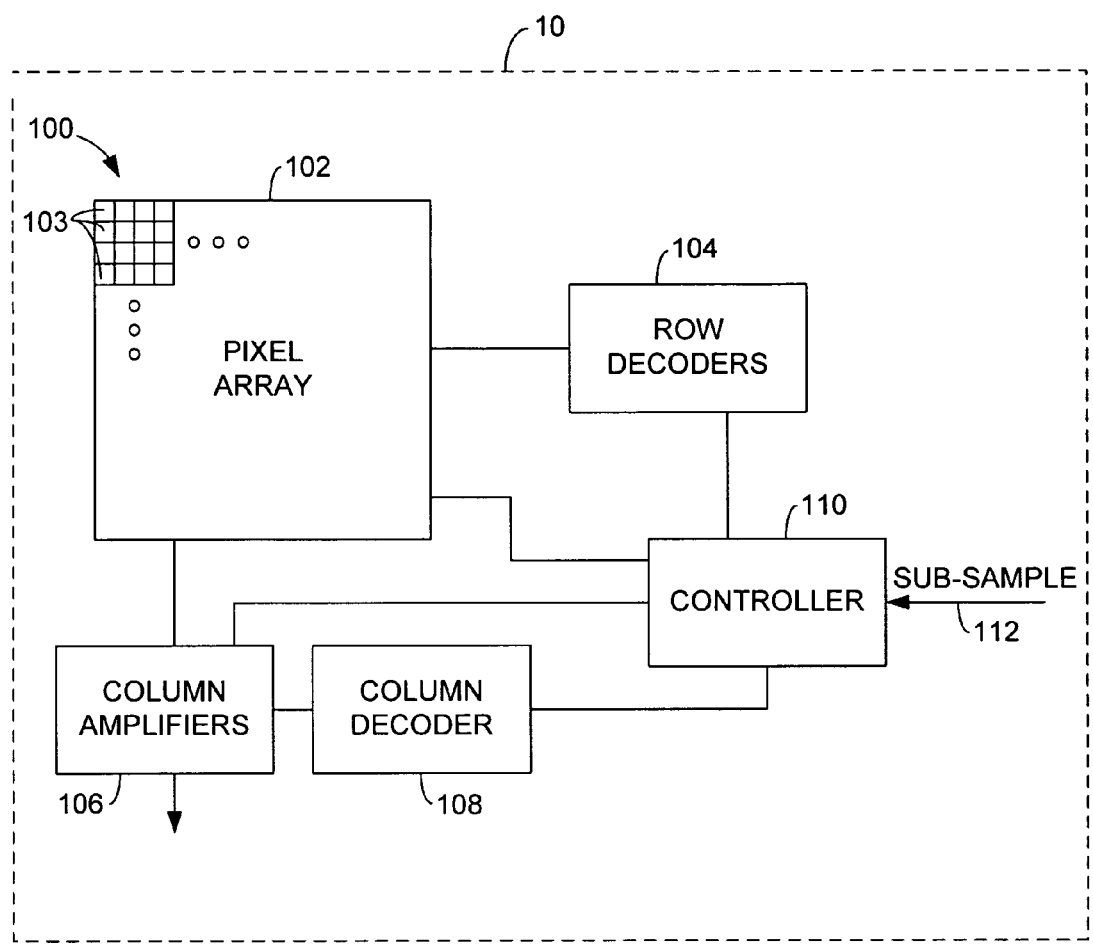
FIG. 1 is a block diagram illustrating major components of an APS image sensor according to an embodiment of the present invention.

FIG. 1 is a block diagram illustrating major components of an active pixel sensor (APS) image sensor 100 according to one embodiment of the present invention. Sensor 100 is formed on an integrated circuit 10 and includes pixel array 102, row decoders 104, column amplifiers 106, column decoder 108, and controller 110. Pixel array 102 includes a plurality of pixel circuits (pixels) 103, with each pixel circuit 103 providing one pixel of image information. The pixel circuits 103 in pixel array 102 are organized into a plurality of rows and a plurality of columns (e.g., 480×640). In one form of the invention, each pixel circuit 103 includes three Metal-Oxide-Semiconductor Field Effect Transistors(MOSFETs) and a photodiode (not shown) configured in a conventional manner known to those of ordinary skill in the art.

Controller 110 is coupled to pixel array 102, row decoders 104, column amplifiers 106, and column decoder 108. Controller 110 generates control signals for controlling the operation of sensor 100, including signals to initiate, maintain, and stop image capture processes. In one embodiment, sensor 100 supports a user-selectable sub-sampling mode of operation, which is selectable via sub-sampling mode input 112.

The rows of pixels 103 in array 102 alternate between even rows and odd rows. In one embodiment, the first row of pixels 103 in array 102 is designated as an even row. Similarly, the columns of pixels 103 in array 102 alternate between even columns and odd columns. In one embodiment, the first column of pixels 103 in array 102 is designated as an even column. In one form of the invention, pixel array 102 is configured in a Red-Green-Blue (RGB) Bayer color filter pattern. In one form of this configuration, even rows of pixels 103 alternate between blue pixels and green pixels, with the first pixel in each even row being a blue pixel, and odd rows of pixels 103 alternate between green pixels and red pixels, with the first pixel in each odd row being a green pixel.

In one embodiment, column amplifiers 106 include one column amplifier for each column of pixels 103 in array 102. The column amplifiers 106 connected to an even column of pixels 103 are referred to as even column amplifiers, and the column amplifiers 106 connected to an odd column of pixels 103 are referred to as odd column amplifiers. In one embodiment, the column amplifier 106 connected to the first column of pixels 103 is identified by the letter "n," and subsequent column amplifiers 106 are identified by integer increments to "n" (e.g., n+1, n+2, n+3, etc.). In one form of the invention, the column amplifiers 106 identified by n, n+2, n+4, etc., are even column amplifiers, and the column amplifiers 106 identified by n+1, n+3, n+5, etc., are odd column amplifiers 106. In one embodiment, the first column in array 102 is identified as column 0 (i.e., n=O).

In one form of the invention, pixel information from pixel array 102 is sampled in rows. The sampling time for each row of pixels is referred to as a row sample interval. A row of pixels 103 in pixel array 102 is selected by row decoders 104.

The sampling of pixel information according to one embodiment is divided into three phases: (1) an integration reset phase; (2) an integration phase; and (3) a sample reset phase. Integration reset starts the sequence. When row decoder 104 decodes a row of pixels, the photodiodes of those pixel circuits are driven to a common starting voltage. When integration starts, the integration period is set by the controller 110 depending on illumination levels. The sample reset phase then starts. The integrated voltages are present on the column lines and sampled by the column amplifiers 106. Once the integration level is sampled, the reset value is captured. The column amplifiers then store the difference between the reset voltages and the integration voltages. Hence, during the integration reset phase, each pixel circuit 103 is reset to ensure that the pixel circuits 103 start from a common voltage independent of the integration level of a previously captured frame. During the integration phase, pixel circuits 103 integrate the amount of light directed onto their photodiodes, and output integrated voltages, Vs. The column amplifiers 106 act as an analog buffer that sample and hold the outputs of a selected row of pixels 103. At the end of the integration phase, column amplifiers 106 sample the integrated signal levels, Vs, from a selected row of pixels 103. During the sample reset phase, a selected row of pixels 103 is reset. At the end of the sample reset phase, column amplifiers 106 sample the reset level, Vr, output by the selected row of pixels 103.

In one embodiment, the image signal generated by each pixel circuit. 103 is the difference between the sampled reset voltage level, Vr, and the sampled integration voltage level, Vs, obtained after the integration period. At the end of two sequential row sample intervals, the difference between the reset signal levels, Vr, and integrated signal levels, Vs, of every other pixel circuit of nonadjacent pixel rows is held on the outputs of column amplifiers 106, referenced to a common mode reference level. During a column processing interval, column amplifiers 106 are sequentially selected in pairs by column decoder 108 to output the sum of the corresponding held levels. One embodiment of sensor 100 also includes gain amplifiers and analog-to-digital converters (not shown), to amplify and digitize signals output by column amplifiers 106.

Figure 2:
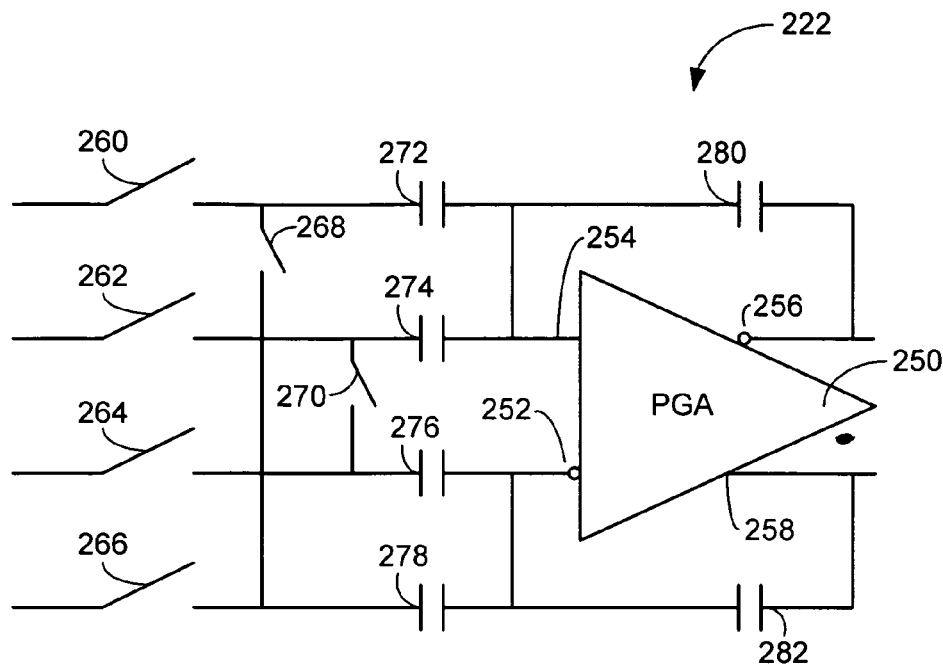
FIG. 2 is an electrical schematic diagram illustrating a programmable gain amplifier configured according to one embodiment of the present invention is a block diagram illustrating a portion of a pixel array and an array of column and programmable gain amplifiers according to one embodiment of the present invention.

Referring now to FIG. 2, it illustrates a schematic diagram of a programmable gain amplifier 222 according to this embodiment of the invention. Here it will be noted that the programmable gain amplifier 222 includes a differential amplifier 250 having an inverting input 252, a non-inverting input 254, an inverting output 256, and a non-inverting output 258. Switches 260, 262, 264, and 266 define inputs of the amplifier 222 to couple the amplifier 222 to the differential outputs of a pair of column amplifiers (not shown). Switches 260-266 are closed during the sample phase and opened during hold phase. Switches 268 and 270 are opened during the sample phase and closed in the hold phase. When they close, sampled charge is transferred to feedback capacitors 280-282. The column amplifiers are capacitively coupled to the programmable gain amplifier 222 by capacitors 272, 274, 276, and 278. Capacitors 280 and 282 provide feedback as will be appreciated by those skilled in the art.

Figure 4:
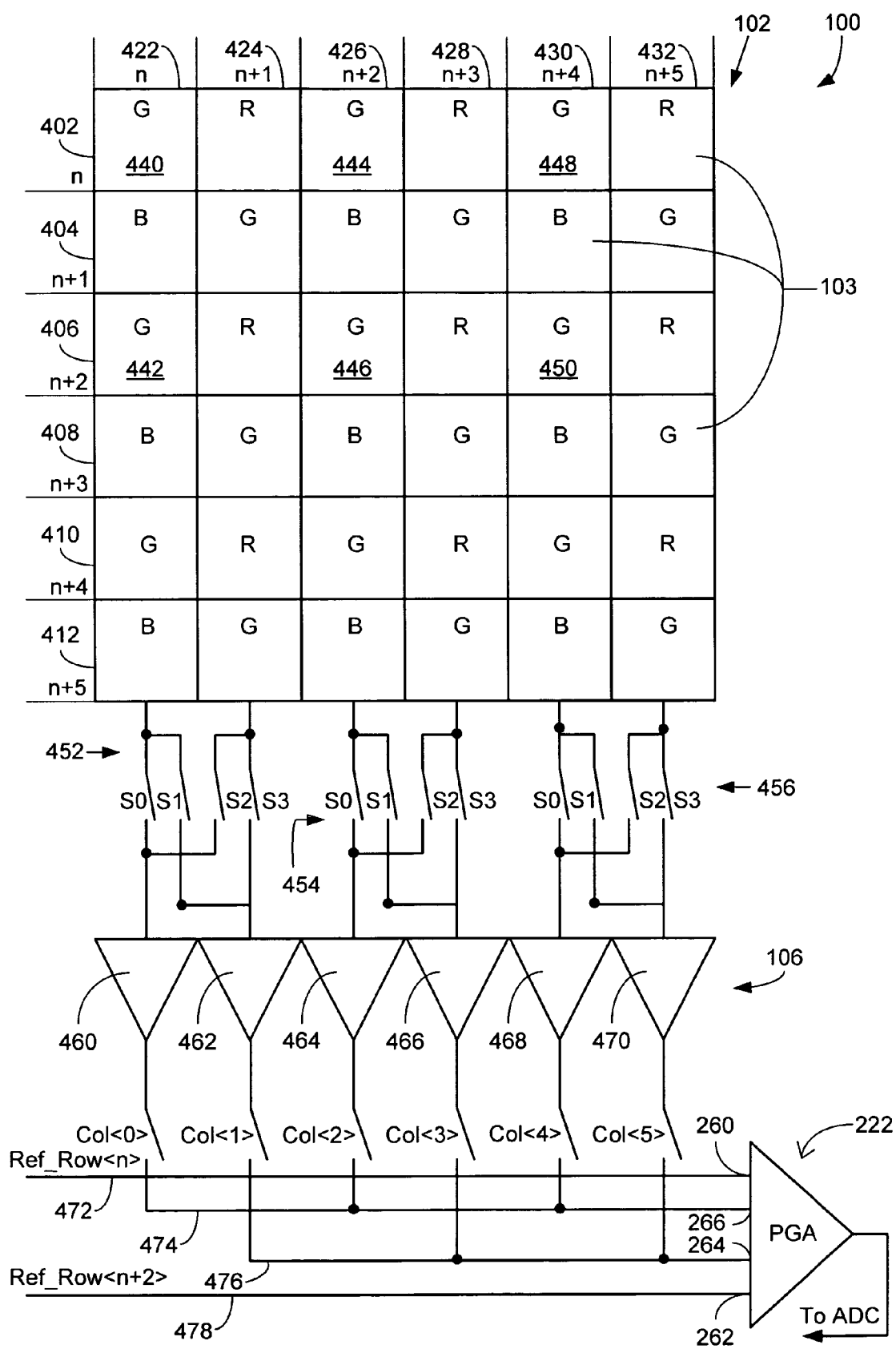
FIG. 4 is a block diagram illustrating a portion of a pixel array and an array of column and programmable gain amplifiers according to one embodiment of the present invention.

FIG. 4 is a block diagram illustrating a portion of the pixel circuit array 103, column amplifiers 106, and the programmable gain amplifier 222 according to one embodiment of the present invention. The array 102 includes the plurality of pixel circuits 103 arranged on rows and columns. Illustrated here are rows 402, 404, 406, 408, 410, and 412 and columns 422, 424, 426, 428, 430, and 432. As may be appreciated, only a portion of an entire array is illustrated.

Associated with column of pixels circuits 103 is a column amplifier. Hence, as will be noted, column amplifiers 460, 462, 464, 466, 468, and 470 are associated with pixel circuit columns 422, 424, 426, 428, 430, and 432 respectively. To provide selective coupling of the illustrated pixel circuits to the column amplifiers, the image sensor 100 includes switching circuits 452, 454, and 456. Each of the switching circuits includes a switch S0, a switch S1, a switch S2, and a switch S3.

During a normal mode, switches S0 and S3 are closed and switches S1 and S2 are open. This permits each pixel circuit to be associate with a respective different one of the column amplifiers when the output voltages of the pixel circuits of each pixel circuit row are transferred to the column amplifiers in parallel. As previously mentioned, the column amplifiers are then read serially into the programmable gain sample and hold amplifier (PGA) associated with their pixel circuit row. Here, only PGA 222 is illustrated.

During a sub-sampling mode, and as previously mentioned, the resulting image is the product of less than all the pixel circuits. According to this embodiment, the sub-sampling is carried out in the analog domain before the image data is read out and digitally quantized. Moreover, the sub-sampling, according to this embodiment is carried out vertically.

Figure 3:
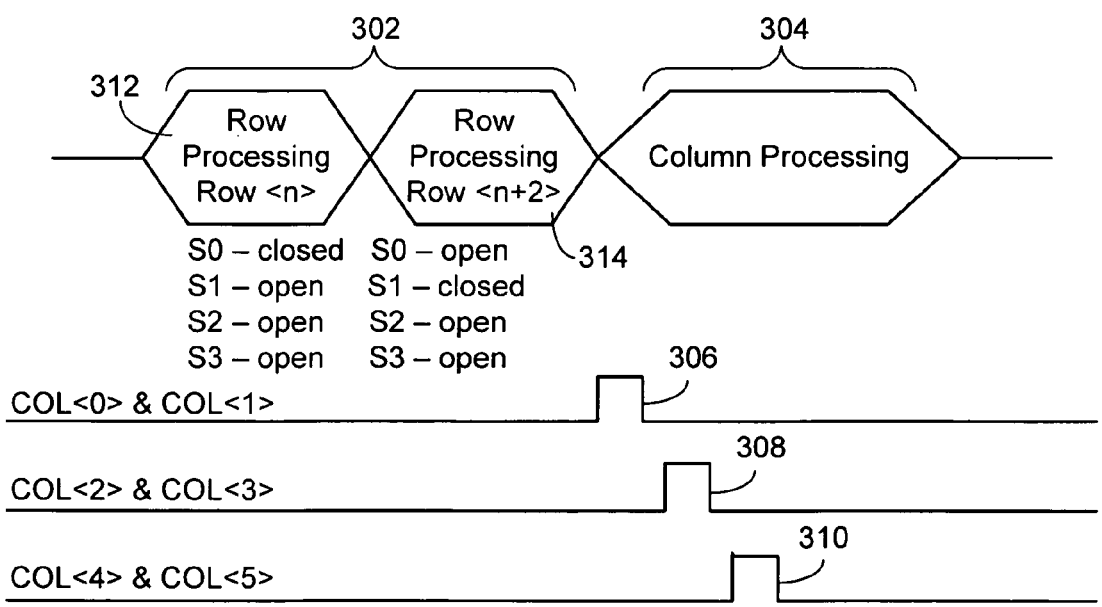
FIG. 3 is timing diagram illustrating a sub-sampling mode according to one embodiment of the invention.

More specifically, as may be noted from the timing diagram of FIG. 3, each row sample interval includes two row processing intervals. Here, row sample intervals 312 and 314 are illustrated for processing row 402 (row n) and row 406 (row n+2). Each row of pixel circuits may be viewed as a set of the array of pixel circuits 103. The rows are nonadjacent. Also, as indicated in FIG. 3, during the sub-sampling row processing interval 312, switch S0 is closed and switches S1, S2, and S3 are open. This causes the output voltages of pixel circuits 440, 444, and 448 to be parallel transferred to a first subset of column amplifiers 460, 464, and 468 respectively. During the following row processing interval 314, switch S1 is closed and switches S0, S2, and S3 are open. This causes the output voltages of pixel circuits 442, 446, and 450 to be parallel transferred to a second subset of column amplifiers 462, 466, and 470 respectively. Pixel circuits 440, 444, and 448 are therefore a subset of the set of pixel circuits of row 402. Similarly, pixel circuits 442, 446, and 450 are a subset of the set of pixel circuits of row 406.

After the output voltages of the pixel subsets have been parallel transferred to the column amplifiers, the column amplifiers are serially coupled to the PGA 222 in pairs. More specifically, as will be noted in the timing diagram of FIG. 3, the column processing interval begins with a column select signal 306 from the controller 110 (FIG. 1) to cause the outputs of column amplifiers 460 and 462 to be coupled to inputs 266 and 264 of PGA 222. The output voltages of column amplifiers 460 and 462 are added by the PGA 222 to effectively average them. The next column select signal 308 then causes the outputs of column amplifiers 464 and 466 to be coupled to inputs 266 and 264 of PGA 222 via input lines 474 and 476, respectively, Input lines 472 and 478 provide reference voltages to PGA 222. The output voltages of column amplifiers 464 and 466 are then also added by the PGA 222 to effectively average them. This continues until all of the column amplifiers pairs have been processed in this manner. Then, the controller will select another pair of nonadjacent pixel circuit rows to process in the same manner. As may be noted, all of the pixels processed at any one time are of the same color. As may be appreciated by those skilled in the art, the outputs of column amplifiers 460, 462, 464, 466, 468, and 470 are pseudo differential and that the companion reference amplifiers are not shown.

As may be noted from the foregoing, pixel circuit sub-sampling is performed vertically and in the analog domain. This allows for either a reduction in the clock cycle to decrease power. Further, because the pixel circuit averaging is performed in the analog domain, there will be an increase in the signal-to-noise ratio. Hence, because multiple column amplifiers are being simultaneously coupled to a single PGA for adding or averaging, fewer values are clocked-out during each row sample interval thus reducing the pixel clock rate and resulting in a reduction in power. Also, because the noise associated with each pixel is uncorrelated, while the signal values add together in a straightforward way, the noise has a root mean square (RMS) relation. This serves to increase the signal-to-noise ratio by a factor of the square root of 2.

Although specific embodiments have been illustrated herein for purposes of description of the preferred embodiment, it will be appreciated by those of ordinary skill in the art that a wide variety of alternate and/or equivalent implementations may be substituted for the specific embodiments shown and described without departing from the scope of the present invention. Therefore, it is manifestly intended that this invention be limited only by the claims and the equivalents thereof.

We claim:

1. An active pixel sensor (APS) image sensor comprising:
   an array of pixel circuits corresponding to rows and columns of pixels;
   a plurality of amplifiers that buffer signals output by the array of pixel circuits;
   a plurality of sample and hold circuits that read the buffered signals;
   a routing mechanism positioned between the array of pixel circuits and the plurality of amplifiers; and
   a controller that selects sets of pixels circuits for sampling, the controller configured to control the routing mechanism (1) to couple each pixel circuit in a set to a different one of the amplifiers during a normal mode of operation, and (2) to couple respective pixel circuits of a first row of pixel circuits in a first set of pixel circuits to respectively different amplifiers of a first subset of the amplifiers, to couple respective pixel circuits of a second row of pixel circuits in a second set of pixel circuits to respectively different amplifiers of a second subset of the amplifiers during a sub-sampling mode, and the controller further configured to control coupling of the amplifiers of the first and second subsets of amplifiers in pairs to a common one of the sample and hold circuits during the sub-sampling mode of operation.

2. The image sensor of claim 1, wherein the pixel circuits of each of the first and second rows of the pixel circuits are in nonadjacent columns.

3. The image sensor of claim 1, wherein the first and second rows of pixel circuits are nonadjacent.

4. The image sensor of claim 3, wherein the pixel circuits of each of the first and second rows of the pixel circuits are in nonadjacent columns.

5. The image sensor of claim 1, wherein the plurality of amplifiers include an amplifier associated with each column of pixel circuits.

6. The image sensor of claim 1, wherein the controller is configured to control the routing mechanism to connect each pair of the amplifiers to the common sample and hold amplifier for simultaneous reading.

7. The image sensor of claim 1, wherein each of the pixel circuits is associated with one of a plurality of different colors and wherein the pixel circuits of the first row of pixel circuits of the first set of pixel circuits and the pixel circuits of the second row of pixel circuits of the second set of pixel circuits are all associated with a common color.

8. An integrated circuit including an active pixel sensor (APS) image sensor comprising:
   an array of pixel circuits corresponding to rows and columns of pixels;
   a plurality of amplifiers that buffer signals output by the array of pixel circuits, each column of pixel circuits of the array of pixel circuits having an associated amplifier;
   a plurality of sample and hold circuits that read the buffered signals; a routing mechanism positioned between the array of pixel circuits and the plurality of amplifiers such that (1) in a first mode of operation the routing mechanism routes signals output by each column of the pixel circuits to the amplifier associated with the column of respective pixel circuits and (2) in a second mode of operation the routing mechanism selectively routes the signals output by a subset of columns of the pixel circuits to the amplifier associated with the column of the respective pixel circuits and a corresponding amplifier not associated with the subset of columns, each amplifier associated with the column of the respective pixel circuits and the corresponding amplifier thereof defining a respective pair of a plurality of pairs of amplifiers; and
   a controller for selecting the first or second mode of operation for sampling, wherein each sample and hold circuit of the plurality of sample and hold circuits, during the second mode of operation, samples a respective pair of amplifiers.

9. The integrated circuit of claim 8, wherein
the controller selects first and second sets of pixels circuits for sampling,
the first set of pixel circuits is a first row of pixel circuits, and the second set of pixel circuits is a second row of pixel circuits, and
the controller is configured to control the routine mechanism to selectively couple each pixel circuit in the first set and second set to one of (1) the amplifier associated with the column of the respective pixel circuit, or (2) the amplifier associated with the column of the respective pixel circuit and the corresponding amplifier, respectively.

10. The integrated circuit of claim 9, wherein the subset of columns of the pixel circuits are nonadjacent columns.

11. The integrated circuit of claim 9, wherein the first and second rows of pixel circuits are nonadjacent.

12. The integrated circuit of claim 11, wherein the subset of columns of the pixel circuits are nonadjacent columns.

13. The integrated circuit of claim 8, wherein the controller is configured to control the routing mechanism to connect each pair of the amplifiers to the common sample and hold amplifier for simultaneous reading.

14. The integrated circuit of claim 9, wherein each of the pixel circuits is associated with one of a plurality of different colors and wherein the pixel circuits of a subset of pixel circuits of the first set of pixel circuits and the pixel circuits of a subset of pixel circuits of the second set of pixel circuits are all associated with a common color.

15. A method of operating an active pixel sensor (APS) image sensor that includes an array of pixel circuits arranged in rows and columns, a plurality of amplifiers that buffer signals output by the array of pixel circuits, and a plurality of sample and hold circuits that read the buffered signals, each column of pixel circuits of the array of pixel circuits having an associated amplifier of the plurality of amplifiers; the method comprising:
  selecting, using a controller, a first mode of operation or a second mode of operation;
  responsive to the selecting of the first mode of operation, routing, by the routing mechanism, signals output by each column of the pixel circuits to an amplifier associated with the column of respective pixel circuits;
  responsive to the selecting of the second mode of operation, alternately routing, by the routing mechanism, signals output by respective nonadjacent columns of the pixel circuits to the amplifier associated with the column of the respective pixel circuits and a corresponding amplifier which corresponds to the amplifier associated with the column of the respective pixel circuits and is not associated with the respective nonadjacent columns;
  simultaneously reading from each sample and hold circuit a pair of the amplifier associated with a respective column and the corresponding amplifier during the second mode of operation.

16. The method of claim 15, wherein a first set of pixel circuits is a first row of pixel circuits and a second set of pixel circuits is a second row of pixel circuits, the method including:
  controlling the routing mechanism to selectively couple each pixel circuit in the first set and second set to one of (1) the amplifier associated with the column of the respective pixel circuits, or (2) the amplifier associated with the column of the respective pixel circuits and the corresponding amplifier, respectively.

17. The method of claim 16, wherein the first and second rows of pixel circuits are nonadjacent.

18. The method of claim 15 wherein the first and second rows of pixel circuits include subsets of pixel circuits and the pixel circuits of each of the subsets of pixel circuits are in nonadjacent columns.

19. An active pixel sensor (APS) image sensor comprising:
  an array of pixel circuits corresponding to rows and columns of pixels;
  a plurality of amplifiers positioned between the plurality of sample and hold circuits and the array of pixel circuits for receiving and buffering signals output by the array of pixel circuits, each column of pixel circuits of the array of pixel circuits having an associated amplifier of the plurality of amplifiers;
  a plurality of sample and hold circuits for reading the buffered signals;
  a routing mechanism positioned between the array of pixel circuits and the plurality of amplifiers to alternately route the signals output by respective nonadjacent columns of the pixel circuits to the amplifier associated with the column of the respective pixel circuits and a corresponding amplifier which is not associated with the respective nonadjacent columns,
  wherein each amplifier associated with the column of the respective pixel circuits and the corresponding amplifier thereof defines a respective pair of a plurality of pairs of amplifiers, and each sample and hold circuit of the plurality of sample and hold circuits samples a respective pair of amplifiers such that values from pixel circuits in each respective non-adjacent column are sub-sampled.

* * * * *